(12) United States Patent
Mauri et al.

(10) Patent No.: US 7,133,264 B2
(45) Date of Patent: Nov. 7, 2006

(54) HIGH RESISTANCE SENSE CURRENT PERPENDICULAR-TO-PLANE (CPP) GIANT MAGNETORESISTIVE (GMR) HEAD

(75) Inventors: Daniele Mauri, San Jose, CA (US); Tsann Lin, Saratoga, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 953 days.

(21) Appl. No.: 10/242,956

(22) Filed: Sep. 13, 2002

(65) Prior Publication Data

US 2004/0052007 A1    Mar. 18, 2004

(51) Int. Cl.
*G11B 5/39* (2006.01)
(52) U.S. Cl. .............. 360/324.11; 360/324.1; 29/603.07
(58) Field of Classification Search ............... None
See application file for complete search history.

(56) References Cited

U.S. PATENT DOCUMENTS

| | | | |
|---|---|---|---|
| 5,627,704 A | 5/1997 | Lederman et al. | 360/113 |
| 5,668,688 A | 9/1997 | Dykes et al. | 360/113 |
| 5,739,987 A | 4/1998 | Yuan et al. | 360/113 |
| 5,739,990 A | 4/1998 | Ravipati et al. | 360/113 |
| 5,796,561 A | 8/1998 | Mauri | 360/113 |
| 5,818,685 A | 10/1998 | Thayamballi et al. | 360/113 |
| 5,828,531 A | 10/1998 | Gill | 360/113 |
| 5,856,897 A | 1/1999 | Mauri | 360/113 |
| 5,880,913 A | 3/1999 | Gill | 360/113 |
| 5,894,385 A | 4/1999 | Gill et al. | 360/113 |
| 6,002,553 A | 12/1999 | Stearns et al. | 360/113 |
| 6,233,125 B1 | 5/2001 | Knapp et al. | 360/317 |
| 6,266,218 B1* | 7/2001 | Carey et al. | 360/324.12 |
| 6,322,640 B1* | 11/2001 | Xiao et al. | 29/603.08 |
| 6,466,418 B1* | 10/2002 | Horng et al. | 360/324.12 |
| 6,614,630 B1* | 9/2003 | Horng et al. | 360/324.12 |
| 6,754,053 B1* | 6/2004 | Yoshikawa et al. | 360/324.1 |

OTHER PUBLICATIONS

*IBM Technical Disclosure Bulletin*, v. 40, n. 4, Apr. 1997, p. 197-198.

* cited by examiner

*Primary Examiner*—Andrea Wellington
*Assistant Examiner*—Christopher R. Magee
(74) *Attorney, Agent, or Firm*—Ervin F. Johnston; Matthew S. Zises

(57) ABSTRACT

A current-perpendicular-to-plane (CPP) spin valve (SV) sensor and fabrication method with a contiguous junction type geometry that increases sensor resistance by up to two orders of magnitude over conventional CPP GMR geometry for a particular track read-width. The superior CPP GMR coefficient ($\delta r/R$) is implemented at an increased sensor resistance by using two small self-aligned SV stacks disposed with the sense current flowing perpendicular thereto when also flowing parallel to the free layer deposition plane. With the CPP geometry of this invention, thicker conductive spacer layers may be used without unacceptable sense current shunting, so the two self-aligned SV stacks may be completed following the free-layer track-mill step. The two SV stacks may be connected in parallel or back-to-back in series to provide different sense voltages.

13 Claims, 7 Drawing Sheets

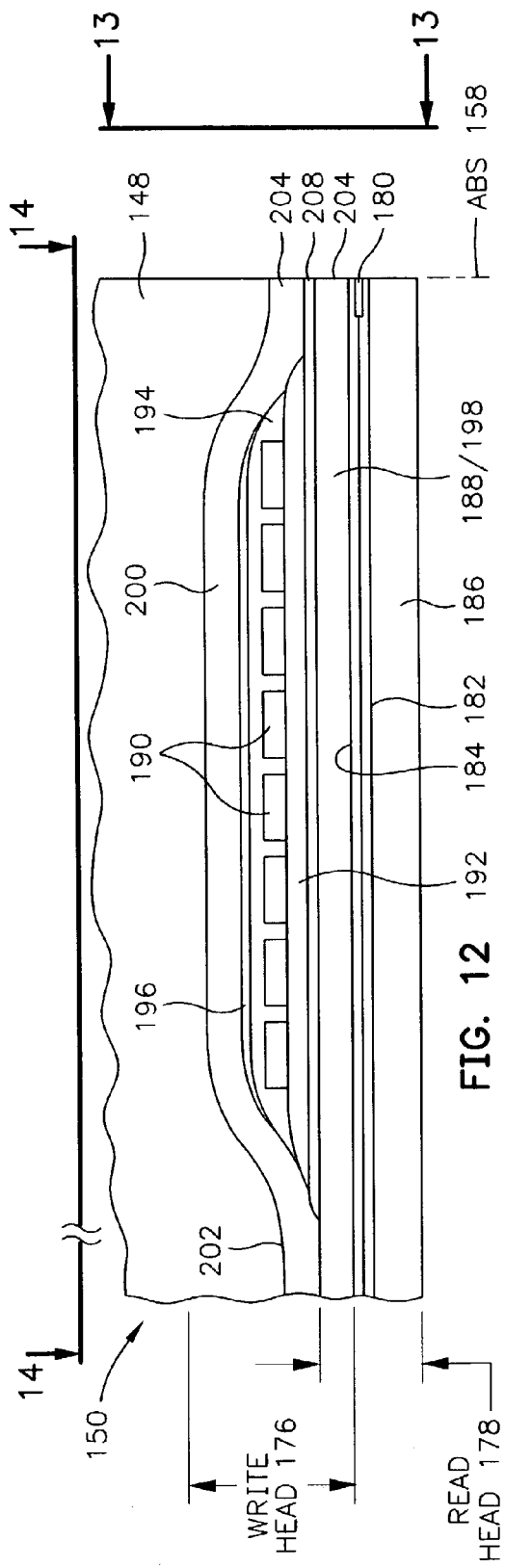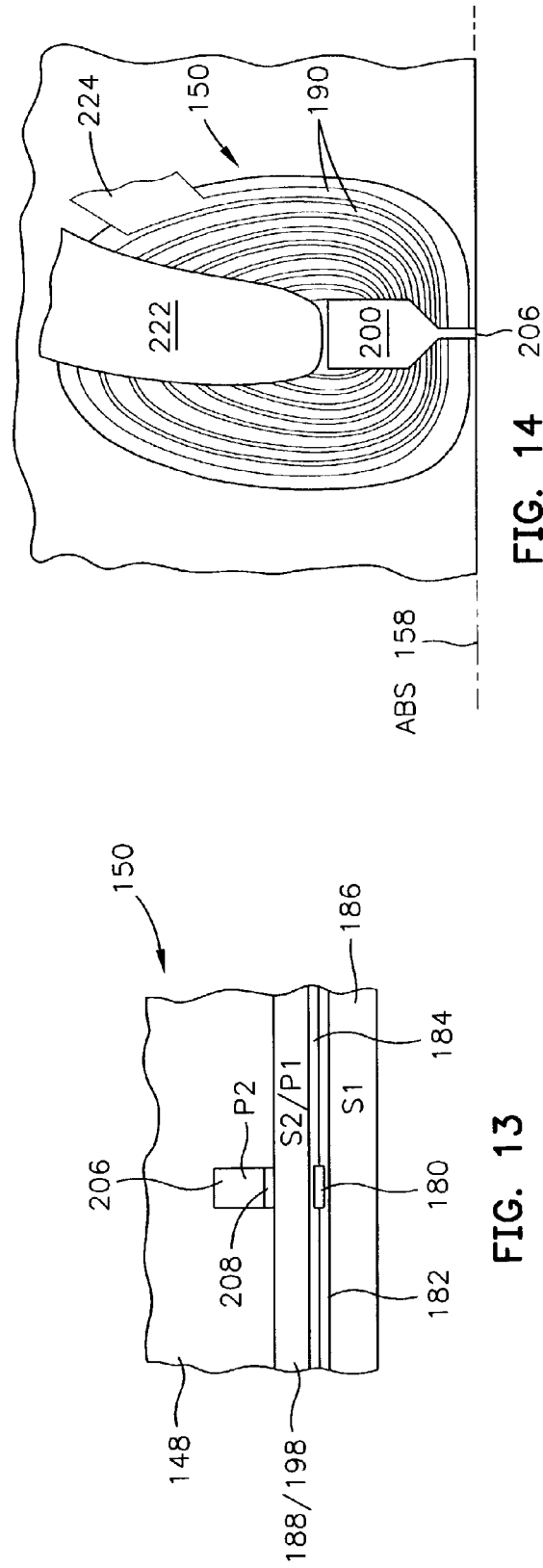

HIGH RESISTANCE SENSE CURRENT PERPENDICULAR-TO-PLANE (CPP) GIANT MAGNETORESISTIVE (GMR) HEAD

BACKGROUND OF THE INVENTION

1. Field of the Invention

This invention relates generally to giant magnetoresistive (GMR) spin valve (SV) sensors and more particularly to a high-sensitivity self-aligned lateral current-perpendicular-to-plane (CPP) dual-SV sensor geometry and fabrication method.

2. Description of the Related Art

Computers often include auxiliary memory storage devices having media on which data can be written and from which data can be read. A direct access storage device (DASD) or disk drive incorporating rotating magnetic disks is commonly used for storing data in magnetic form in concentric, radially-spaced tracks on the disk surfaces. Magnetic heads including read sensors are then used to read data from the tracks on the disk surfaces.

In high capacity disk drives, magnetoresistive (MR) read sensors (MR heads) are preferred in the art because of their capability to read data at greater track and linear densities than earlier thin film inductive heads. An MR sensor detects the magnetic data on a disk surface through changes in the MR sensing layer resistance, which are responsive to changes in the magnetic flux sensed by the MR layer.

The early MR sensors rely on the anisotropic MR (AMR) effect in which an MR element resistance varies as the square of the cosine of the angle between the magnetic moment of the MR element and the direction of sense current flowing through the MR element. Recorded data can be read from a magnetic medium because the external magnetic field from the recorded magnetic medium (the signal field) changes the moment direction in the MR element, thereby changing the MR element resistance and the sense current or voltage.

The later giant magnetoresistance (GMR) sensor relies on the spin-scattering effect. The chief source of the GMR effect is "spin-dependent" scattering of electrons. In GMR sensors, the resistance varies as a function of the spin-dependent scattering of the conduction electrons across two magnetic layers separated by a non-magnetic spacer layer. The spin-dependent scattering occurs at the interface of the magnetic and nonmagnetic layers and within the magnetic layers. Electrical resistance is affected by scattering of electrons moving through a material. Depending on the direction of its magnetic moment, a single-domain magnetic material scatters electrons with "up" or "down" spin differently. When the free and pinned magnetic layers in a GMR structure are aligned anti-parallel, the resistance is high because "up" electrons that are not scattered in one layer may be scattered in the other. When the layers are aligned in parallel, scattering is reduced for all of the "up" electrons, regardless of which layer they pass through, yielding a lower resistance. GMR sensors using only two layers of ferromagnetic (FM) material separated by a thin layer of non-magnetic conductive material (e.g., copper) are generally referred to in the art as spin valve (SV) sensors.

The sense current-in-plane (CIP) SV sensor is well-known in the art and includes a nonmagnetic electrically conductive spacer layer sandwiched between a FM pinned layer structure and a FM free layer structure. An antiferromagnetic (AF) pinning layer interfaces the pinned layer structure for pinning a magnetic moment of the pinned layer structure 90E to an air bearing surface (ABS), which is an exposed surface of the sensor that faces the magnetic disk. Two sense current lead conductors are connected on each side of the layered SV structure to conduct sense current in the plane of the several layers. The magnetic moment of the free layer structure is free to rotate upwardly and downwardly with respect to the ABS from a quiescent position or bias point in response to positive and negative magnetic field signals present on the surface of an adjacent rotating magnetic disk. The quiescent position, which is preferably parallel to the ABS, is the position of the magnetic moment of the free layer structure with the operating-bias sense current conducted through the sensor in the absence of external magnetic fields.

The spacer layer thickness is chosen to minimize the shunting of the CIP sense current and the magnetic coupling between the free and pinned layer structures. This thickness is typically less than the mean free path of electrons conducted through the sensor. With this arrangement, a portion of the conduction electrons are scattered at the conductive spacer layer interfaces with the pinned and free layer structures. Such scattering is minimal when the pinned and free layer magnetic moments are parallel with one another, and increases substantially when the magnetic moments are antiparallel. Because changes in scattering affects the SV sensor resistance, the sensor resistance varies as a weighted function of cos θ, where θ is the relative angle between the magnetic moments of the pinned and free layer structures. SV sensor sensitivity is quantified in terms of the MR coefficient, δr/R, where R is the sensor resistance when the magnetic moments are parallel and δr is the change in the sensor resistance arising from shifting the moments into an antiparallel position.

The sensitivity of a SV sensor depends upon the response of the free layer to external magnetic field signals from the surface of a rotating magnetic disk. The magnetic moment of the free layer depends upon the material or materials employed for the free layer. The responsiveness of the free layer decreases as the magnetic moment of the free layer increases. Reduced responsiveness means the free layer magnetic moment cannot rotate as far from its parallel position to the ABS for a given external magnetic field level, which reduces sensor signal output. Also, improved isolation of the free layer structure from the pinned layer structure usually requires a thicker intermediate conductive layer, which shunts sense current away from the FM layers, thereby reducing sensor resistance and sensitivity.

For example, FIG. 1 shows an ABS view (disposed for vertical relative medium motion) of a typical CIP SV sensor 20 from the prior art that is stabilized using the hard magnetic (HM) layers 22 formed by a lift-off process. SV sensor 20 is usually fabricated using thin-film deposition techniques known in the art. For example, a first shield (S1) layer 24 of a conductive material is formed on a substrate (not shown) and an insulating layer 26 of alumina, or the like, is deposited over S1 layer 24. The SV layers are then deposited in sequence over insulating layer 26. For example, the AFM pinning layer 28 is deposited followed by the FM pinned layer 30 to form a pinned layer structure. Next, the conductive spacer layer 32 of copper, or the like, is deposited followed by the FM free layer 34. Finally, a photoresist layer (not shown) is formed over the entire assembly and is processed in the usual manner to permit all material outside of the central (read-width) region 36 to be removed by etching down to insulating layer 26 (the "track-mill" step). After etching, a HM material is deposited over the exposed portions of insulating layer 26 and also over the remaining photoresist layer (not shown) in central region 36 and, before removing the photoresist layer covering central region 36, a conductive lead layer 38 is deposited over everything. The photoresist layer is then finally dissolved away, which "lifts off" the unwanted portions (not shown) of the HM layer 22 and lead layer 26 within central region 36, in a well-known manner. Because of this lift-off deposition procedure, the later layers are tapered to a very slight thickness at the junction with central region 36. The sense current (not shown) flows parallel to the plane of layers 28–34 from one side of lead layer 38 to the other, so the (fixed) conductivity of conductive spacer layer 32 reduces the GMR effect of scatter-dependent conductivity of MR layers 30 and 34.

As an alternative to the CIP structure, the sense current lead conductors may be arranged so that the sensing current passes through the sensor perpendicular to the plane of the layers, which is known in the art as current-perpendicular-to-plane (CPP) geometry. In an early paper, [AA New Design for an Ultra-High Density Magnetic Recording Head Using a GMR Sensor In the CPP Mode," Rottmayer, R. and Zhu, J.; *IEEE Transactions on Magnetics*, Vol. 31, No. 6, November 1995], Rottmayer et al. propose a GMR multi-layer read element within a write head gap that operates in the CPP mode and is biased by an exchange coupled soft film acting like a permanent magnet while distinguishing conventional MR and SV head designs. Their read element has a repeated multilayer structure (to increase GMR sensitivity) that is quite different from the GMR SV stack later introduced in the art.

For example, FIG. 2 shows a partial ABS view (disposed for vertical relative medium motion) of a typical CPP SV sensor 40 from the prior art. Sensor 40 includes a substrate 42 with an overlying underlayer 44. In turn, an insulating gap layer 46 overlies underlayer 44. A first magnetic shield (S1) layer 48 overlies gap layer 46 substantially as shown. An optional gap layer 50, which may include aluminum-oxide ($Al_2O_3$) or silicon-dioxide($SiO_2$), may be formed upon first magnetic shield (S1) layer 48. The S1 & S2 shield layers may include nickel iron (NiFe), cobalt-zirconium-tantalum (CoZrTa), iron-nitride (FeN) or any other useful soft magnetic materials or their alloys, and may be about 2 microns or less in thickness. Gap layer 50 may be from about 10 to about 100 nanometers in thickness. A first lead (L1) layer 52 is formed on top of gap layer 50. First lead (L1) layer 52 may include between 10 and 100 nanometers in thickness of rhodium (Rh), aluminum (Al), gold (Au), tantalum (Ta) or silver (Ag) or their alloys. A FM free layer 54 overlies first lead (L1) layer 52. A non-magnetic conductive spacer layer 56, usually copper (Cu), overlies free layer 54 and a pinned layer 58 is formed on top of spacer layer 56. A pinning layer 60 overlies pinned layer 58 and a second lead (L2) layer 62, of material similar to that used to produce first lead layer 52, is formed thereon. First and second lead layers 52, 62 in conjunction with free layer 54, spacer layer 56, pinned layer 58 and pinning layer 60 together make up the SV stack 64, substantially as shown. An optional gap layer 66 may overly second lead (L2) layer 62 to isolate therefrom the second magnetic shield (S2) 68. A dielectric gap material 70 surrounds SV stack 64 and portions of first (L1) and second (L2) lead layers 52, 62 substantially as shown. The sense current (not shown) flows perpendicular to the plane of layers 94–100 from one to the other of lead layers 52, 62. The inverted SV structure wherein pinning layer 60 and pinned FM layer 58 underlie active FM layer 54, may be used instead of the more conventional arrangement of active and pinned layers shown.

By passing the sense current through SV stack 64 perpendicularly to the plane of layers 54–60, the spin-dependent scattering effect may be exploited while eliminating the effect of the in-plane current usually shunted through the non-magnetic layers such as conductive spacer layer 56. It has been demonstrated that the CPP GMR coefficient ($\delta r/R$) is accordingly larger than the CIP GMR coefficient. However, because the film layers 54–60 are quite thin, they have a low resistance perpendicular to their plane (even with modern read-width and throat-height dimensions of about 500 nm) and the series resistance of first (L1) and second (L2) lead layers 52, 62 significantly reduces the sensitivity of the CPP SV sensor over what could otherwise be available. This is true with read-width (RW) and throat-height (TH) dimensions of about 500 nm each and is likely to remain so until these dimensions are reduced by an order of magnitude.

Practitioners in the art have proposed various useful solutions to the CPP SV resistance problem; some proposing to reduce the lead resistance and others proposing to increase the effective CPP SV stack resistance. For example, in U.S. Pat. No. 6,134,089, Ronald Barr et al. disclose a technique for reducing sense lead conductor resistance to better exploit the little resistance available in the CPP GMR stack. In U.S. Pat. No, 6,198,609, Ronald Barr et al. disclose a fabrication technique for increasing stack resistance by preventing sense current shunting at the edges of the CPP GMR stack, thereby improving sensitivity. In U.S. Pat. 5,668,688, John Dykes et al. propose increasing stack resistance by using two SV stacks in series to provide an enhanced $\delta r/R$ response said to be twice that seen for CIP SV geometries. Moreover, in U.S. Pat. No. 6,233,125, Kenneth Knapp et al. disclose a CPP MR read sensor that is formed in a groove between two conductors by a method results in the sense current passing twice through the MR thickness, thereby doubling the sensor CPP SV stack resistance. Although these proposals do improve exploitation of the inherently better CPP GMR sensitivity by enhancing CPP resistance in different ways, most of these proposed solutions require much more elaborate fabrication procedures than do the simpler CIP SV sensor.

Thus, the larger CPP GMR effect ($\delta r/R$) does not readily result in the expected improvement in GMR sensor signal amplitude over CIP SV geometries because the CPP SV resistances are so much lower than the corresponding CIP SV sensor resistances, leading to lower voltage drops for given sense current amplitudes. These unresolved problems and deficiencies are clearly felt in the art and are solved by this invention in the manner described below.

SUMMARY OF THE INVENTION

This invention solves the above problem with a current-perpendicular-to-plane (CPP) spin valve (SV) sensor and fabrication method using a contiguous junction type geometry that increases sensor resistance by up to two orders of magnitude over conventional CPP GMR geometry for a particular track read-width.

It is a purpose of this invention to exploit the superior CPP GMR coefficient ($\delta r/R$) at an increased sensor resistance by using at least two small self-aligned SV stacks disposed with the sense current flowing perpendicular thereto when also flowing parallel to the free layer deposition plane. It is an advantage of the sensor fabrication method of this invention that a thicker conductive spacer layer may be used without unacceptable sense current shunting so the self-aligned SV stacks may be completed following the free-layer track-mill step.

In one aspect, the invention is a method of making a sense CPP SV sensor for sensing changes in an external magnetic field at an air bearing surface (ABS), including the steps of forming a ferromagnetic (FM) free layer having a center region disposed at the ABS, removing the free layer on two sides to leave the center region between two edges, forming a nonmagnetic conductive spacer layer on each side of the free layer center region over the free layer edges, forming a FM pinned layer structure having a magnetic moment on each side of the free layer center region over the nonmagnetic conductive spacer layer, forming an antiferromagnetic (AF) pinning layer on each side of the free layer center region exchange-coupled to the pinned layer structure for pinning the magnetic moment thereof and forming a first conductive lead layer on each side of the free layer center region over and in conductive contact with the pinned layer structure.

In another aspect, the invention is a method of making magnetic head assembly that has an ABS, including the steps of making a write head by forming FM first and second pole piece layers in pole tip, yoke and back gap regions wherein the yoke region is located between the pole tip and back gap regions, forming a nonmagnetic nonconductive write gap layer between the first and second pole piece layers in the pole tip region, forming an insulation stack with at least one coil layer embedded therein between the first and second pole piece layers in the yoke region, and connecting the first and pole piece layers at the back gap region; and making a read head by forming nonmagnetic nonconductive first and second read gap layers between the first shield layer and the first pole piece layer and forming a sense CPP SV sensor between the first and second read gap layers by forming a FM free layer having a center region disposed at the ABS, removing the free layer on two sides to leave the center region between two edges, forming a nonmagnetic conductive spacer layer on each side of the free layer center region over the free layer edges, forming a FM pinned layer structure having a magnetic moment on each side of the free layer center region over the nonmagnetic conductive spacer layer, forming an AF pinning layer on each side of the free layer center region exchange-coupled to the pinned layer structure for pinning the magnetic moment thereof, and forming a first conductive lead layer on each side of the free layer center region over and in conductive contact with the pinned layer structure.

In an exemplary embodiment, the invention is a magnetic read head for reading changes in an external magnetic field at an ABS, including a sense CPP SV sensor with a FM free layer having a center region disposed at the ABS to couple responsively to the external magnetic field, a first conductive lead layer disposed on each side of the center region for conducting the sense current, a FM pinned layer structure having a magnetic moment disposed at the ABS between the first conductive lead layer and the free layer on each side of the center region, a nonmagnetic conductive spacer layer disposed at the ABS between the pinned layer structure and the free layer on each side of the center region, and an AF pinning layer exchange-coupled to the pinned layer structure for pinning the magnetic moment thereof.

In yet another aspect, the invention is a magnetic head assembly having an ABS, with a write head including FM first and second pole piece layers that have a yoke portion located between a pole tip portion and a back gap portion, the first and second pole piece layers being connected at their back gap portions, a nonmagnetic write gap layer located between the pole tip portions of the first and second pole piece layers, and an insulation stack with at least one coil layer embedded therein located between the yoke portions of the first and second pole piece layers; and a read head including a FM first shield layer, nonmagnetic nonconductive first and second read gap layers disposed between the first shield layer and the first pole piece layer, and a CPP SV sensor disposed at the ABS between the first and second read gap layers, having a FM free layer with a center region disposed at the ABS to couple responsively to the external magnetic field, a first conductive lead layer disposed on each side of the center region for conducting the sense current, a FM pinned layer structure having a magnetic moment disposed at the ABS between the first conductive lead layer and the free layer on each side of the center region, a nonmagnetic conductive spacer layer disposed at the ABS between the pinned layer structure and the free layer on each side of the center region, and an AF pinning layer exchange-coupled to the pinned layer structure for pinning the magnetic moment thereof.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 12 is a partial view of the slider and magnetic head as seen in plane 12—12 of FIG. 8;

FIG. 13 is a partial ABS view of the slider taken along plane 13—13 of FIG. 12 to show the read and write elements of the magnetic head; and FIG. 14 is a view taken along plane 14—14 of FIG. 12 with all material above the second pole piece removed.

DESCRIPTION OF THE PREFERRED EMBODIMENT

Figure 2:
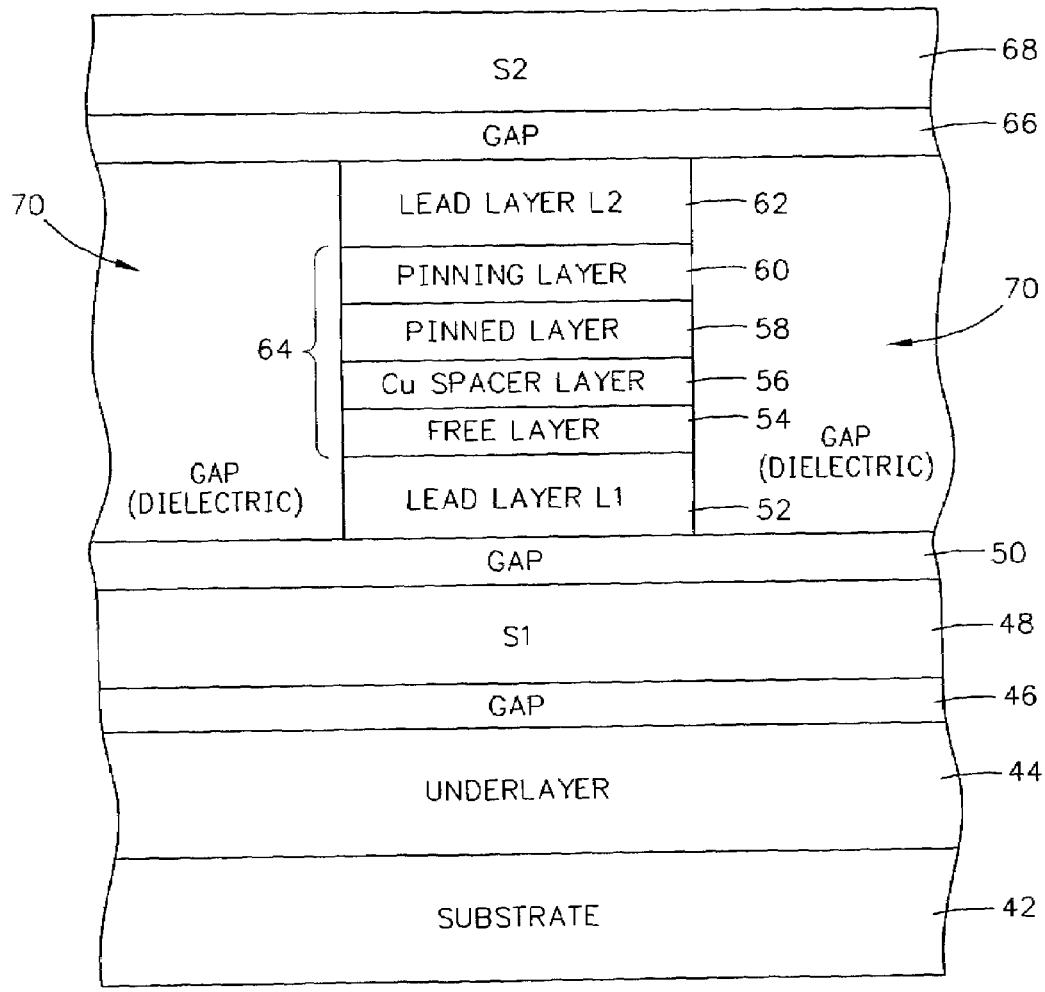
FIG. 2 is a schematic diagram illustrating part of the ABS view of a typical current perpendicular-to-the-plane (CPP) SV sensor embodiment from the prior art.
Figure 3:
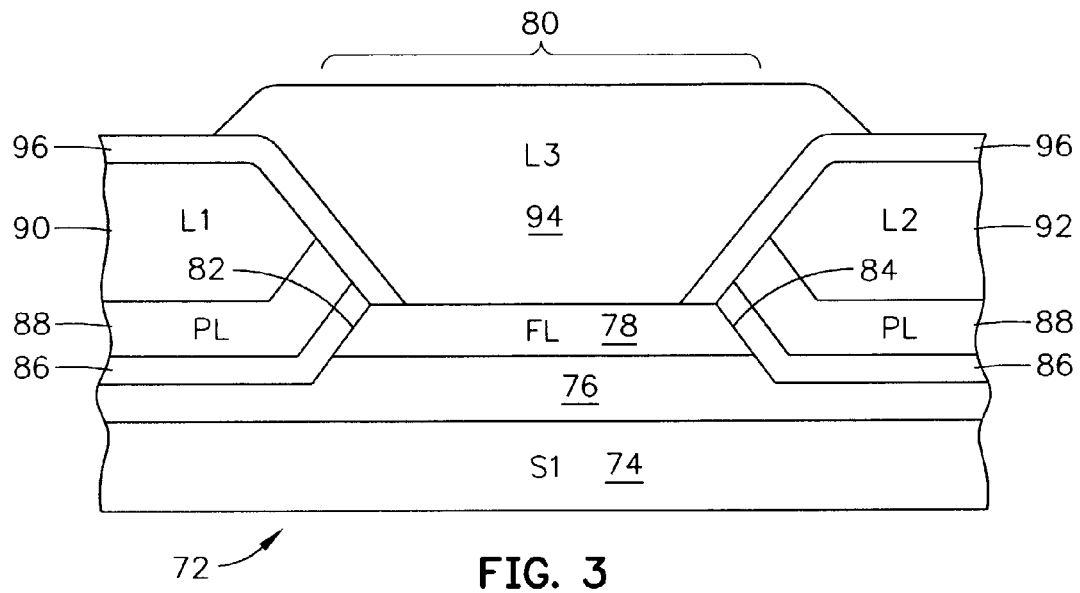
FIG. 3 is a schematic diagram illustrating part of the ABS view of a basic embodiment of the CPP SV sensor of this invention.

Referring now to the drawings wherein like reference numerals designate like or similar parts throughout the several views, FIG. 3 shows a basic embodiment 72 of the current-perpendicular-to-plane (CPP) spin valve (SV) sensor of this invention viewed from the air bearing surface (ABS) and oriented so that in operation the data storage medium moves vertically in the plane of FIG. 3 with respect to sensor 72. After forming the ferromagnetic (FM) shield (S1) layer 74 and the nonmagnetic nonconductive read gap layer 76, instead of the usual SV stack (see, for example, SV stack 64 in FIG. 2), only the ferromagnetic (FM) free layer 78 is formed before performing the track-width mill step to define the center region 80, which represents the read-width (RW) of sensor 72, disposed between the free-layer edges 82 & 84. To do the track-width mill, a photoresist pattern (not shown) is deposited over center region 80 to protect free layer 78 while the unwanted material is etched away from the areas outside of center region 80.

Figure 1:
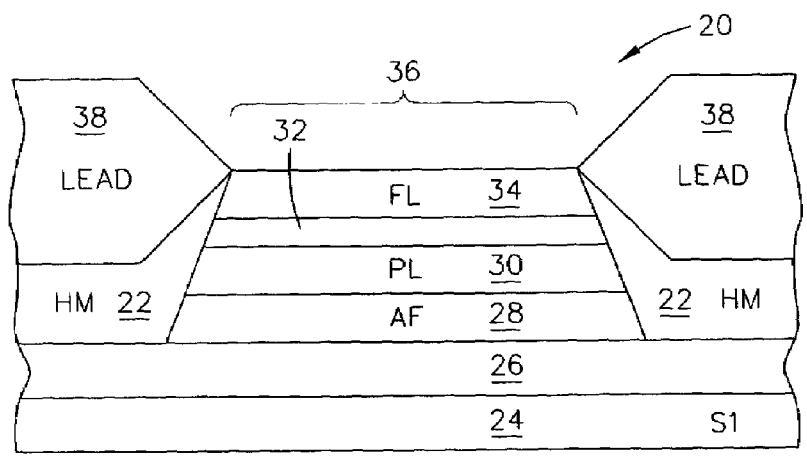
FIG. 1 is a schematic diagram illustrating part of the air-bearing surface (ABS) of a typical current-in-plane (CIP) spin valve (SV) sensor embodiment from the prior art.

After the track-width mill, a self-aligned structure is deposited to form two SV stacks at each free-layer edge 82 & 84 by virtue of the same photoresist pattern used for the track-width mill. First, a thin nonmagnetic conductive spacer layer 86 is deposited to cover free-layer edges 82 & 84, using copper (Cu) or other similar material. Although control of the thickness of spacer layer 86 is crucial for minimizing unwanted shunt current in the current-in-plane (CIP) SV stack (FIG. 1), spacer layer 86 thickness is relatively unimportant here. For this reason, the ex-situ deposition of two acceptable-quality SV stacks at free-layer edges 82 & 84 is easily managed using well-known deposition techniques. After depositing spacer layer 86, the FM pinned layer and pinning layer structures 88 may be deposited using the same track-width mill photoresist pattern. Any useful pinned-pinning layer structure may be used for the CPP SV sensor of this invention. For example, in commonly-assigned U.S. Pat. No. 5,880,913, Gill discloses a SV stack that uses a multiple antiparallel (AP) pinned-layer structure suitable for use with the sensor of this invention. For example, the AP pinned layer structure may include two FM AP pinned layers with the first AP pinned layer interfacing the pinning layer and the second AP pinned layer interfacing the spacer layer and an AP coupling layer located between and interfacing the first and second AP pinned layers. Finally, using the same alignment pattern, the first sense current conductor layer is deposited to form a first lead conductor (L1) layer 90 and a second lead conductor (L2) layer 92. The photoresist pattern is then lifted off and an insulation layer (not shown) is deposited over the entire structure, unless a second shunt conductor layer 94 is desired.

Shunt conductor layer 94 is not necessary to this invention but is preferred for several reasons. It may be easily formed by first patterning and depositing a self-aligned insulating layer 96 on top of lead conductor (L1 & L2) layers 90 & 92 to isolate them from shunt lead conductor (L3) layer 94. Shunt lead conductor (L3) layer 94 helps to limit the parasitic resistance arising from center region 80 of free layer 78, which is contributing very little to the sensor GMR coefficient ($\delta r/R$). Shunt lead conductor (L3) layer 94 also helps to reduce joule heating arising from larger sense currents, thereby permitting operation with larger sense voltages.

In operation, it may be readily appreciated from the above description of FIG. 3 that the cross-sectional areas (and resistances) of each SV stack at free-layer edges 82 & 84 are proportional to the product of the stripe height (SH) (along the dimension oriented into the page) and the thickness of free layer 78. This compares with the cross-sectional area (and resistance) of conventional CPP SV stack 64 in FIG. 2, which is proportional to the product of SH and RW. Clearly, the thickness of free layer 78 may be fabricated to be one or more orders of magnitude less than the RW. Thus, the CPP resistance of each SV stack at free-layer edges 82 & 84 can be orders of magnitude more than the CPP resistance of conventional CPP SV stack 64 in FIG. 2. This is an important advantage of the sensor of this invention. Furthermore, because sensor 72 provides two SV stacks (at free-layer edges 82 & 84) in a single fabrication process, connecting the SV stacks in series doubles the sensor resistance when sense current is conducted from lead conductor (L1) layer 90 to lead conductor (L2) layer 92. The two SV stacks (at free-layer edges 82 & 84) may also be connected in parallel by shorting lead conductor (L1) layer 90 to lead conductor (L2) layer 92 and conducting sense current therefrom to shunt lead conductor (L3) layer 94, but this configuration reduces sensor resistance by a factor of four. The advantage to parallel SV stack operation is the opportunity to short lead conductor (L1/L2) layers 90 & 92 to the shield (S1) layer 74 and to short shunt lead conductor (L3) layer 94 to the upper shield (S2) layer (not shown), provided that the bottom of free layer 78 remains isolated. Such an arrangement permits improved thermal sinking, increased sense current level and eliminates the gap insulation problem known in the art.

The CPP SV sensor of this invention may be longitudinally stabilized to suppress Barkhausen noise by using any useful stabilization technique known in the art. For example, in FIG. 4, a hard-stabilized CPP SV sensor 98 is illustrated. After forming insulating layer 96, a hard-magnetic (HM) stabilizing layer 100 is formed in contact with free layer 78 using a geometry typical of the prior art. The remainder of sensor 98 may be appreciated with reference to the above discussion of sensor 72 (FIG. 3).

The CPP SV sensor of this invention may also be longitudinally stabilized to suppress Barkhausen noise by using a self-stabilized SV sensor geometry in which a layer of high-resistance hard magnetic (HM) material is deposited under or over a SV stack to longitudinally bias the free layer through indirect coupling at the edges of the stack. For example, in FIG. 5, a self-stabilized CPP SV sensor 102 is illustrated. After forming insulating read gap layer 76, a HM layer 104 is formed. A very thin nonmagnetic nonconductive spacer layer 106 is then formed to provide the separation needed to avoid direct magnetic coupling (exchange or Neel) of HM layer 104 to free layer 78. Free layer 78 is then deposited. The track-width milling step is now used to define the width of both free layer 78 and HM layer 104 by over-milling down into insulating read gap layer 76. Magnetostatic forces, analogous to the forces exerted by the pinned layer moment transversely on the free layer, act to longitudinally stabilize the free layer antiparallel to the HM moment. The self-stabilized sensor has an efficient geometry because the critical dimensions are milled in a single step, providing a consistent structure from device to device and from wafer to wafer to optimize the balance of SV stability and sensitivity. After overmilling, an insulating spacer layer 108 is deposited to prevent any contact between HM layer 104 and conductive spacer layer 86, which is next deposited. The remainder of sensor 102 may be appreciated with reference to the above discussion of sensor 72 (FIG. 3).

Figure 5:
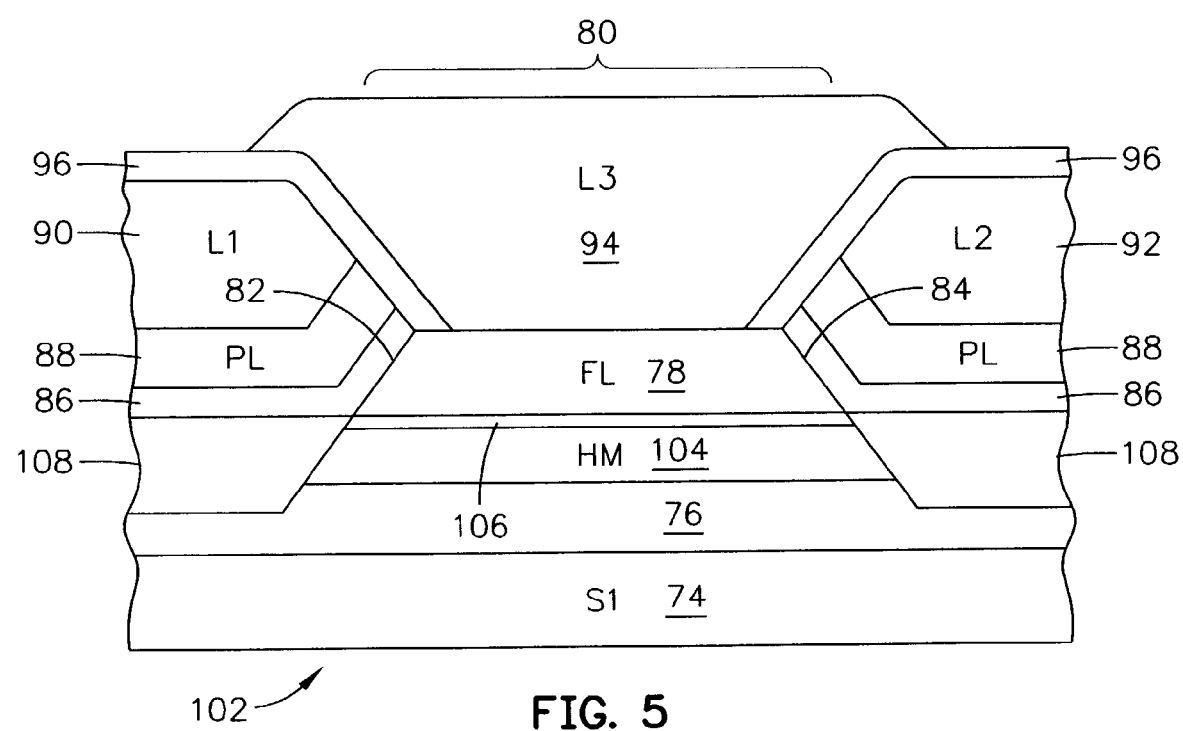
FIG. 5 is a schematic diagram illustrating part of the ABS view of an alternative self-stabilized embodiment of the CPP SV sensor of this invention.
Figure 6:
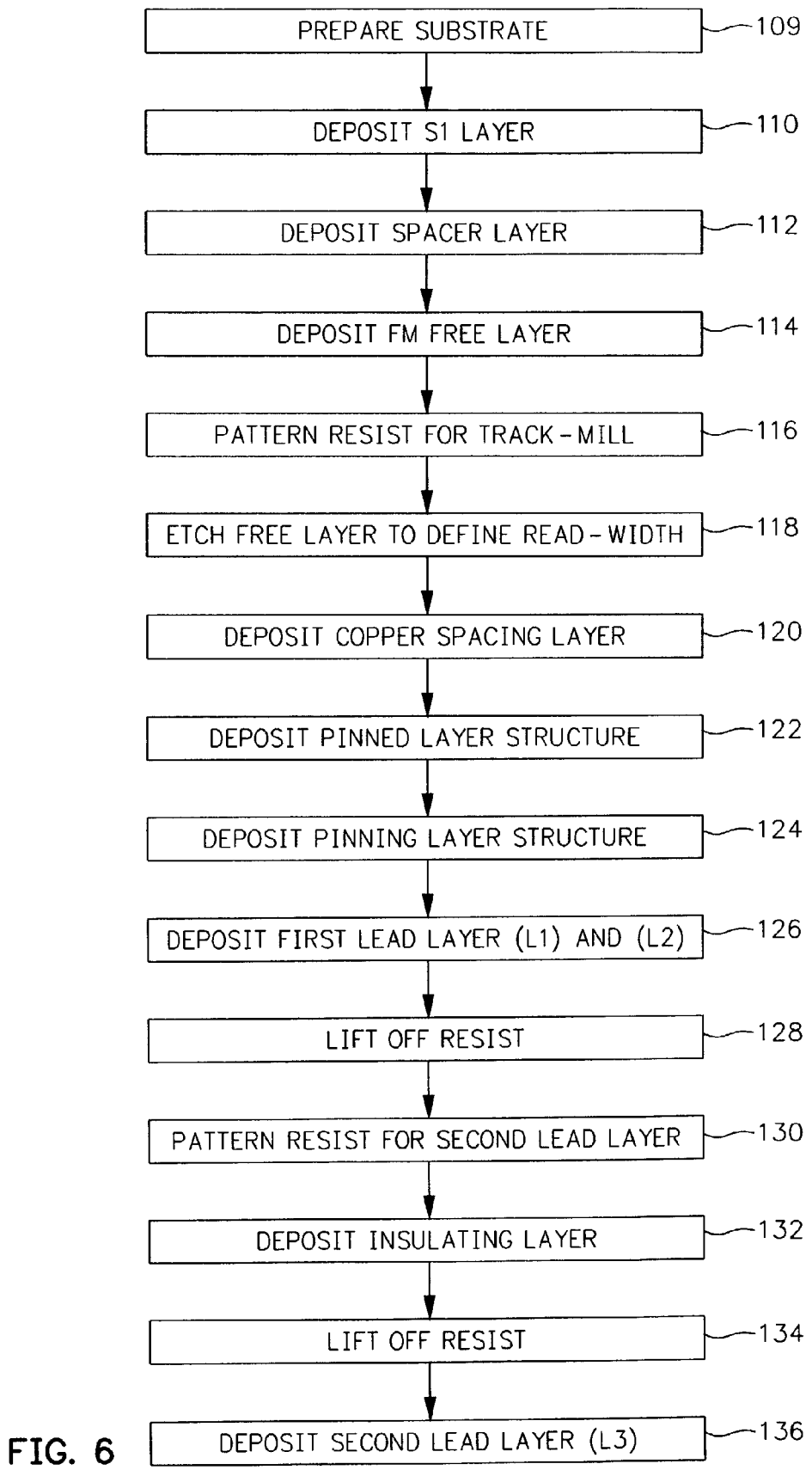
FIG. 6 is a block diagram of a flow chart illustrating an embodiment of the CPP SV sensor fabrication method of this invention.

FIG. 6 is a block diagram of a flow chart illustrating the fabrication method of this invention and may be appreciated with reference to CPP SV sensor 72 in FIG. 3 and the following description. In step 109, the surface of a substrate is prepared for the deposition of ferromagnetic (FM) shield (S1) layer 74 in step 110. In step 112, nonmagnetic nonconductive read gap layer 76 is formed over shield (S1) layer 74 and may be covered in a seed layer (not shown) before ferromagnetic (FM) free layer 78 is formed in step 114. Step 114 may also include preliminary steps (not shown) such as formation of self-stabilizing HM layer 106 (FIG. 5). In step 116, a photoresist pattern is formed over center region 80 to define the track-width and the track-width etch is done in step 118. In step 120, a self-aligned nonmagnetic conductive spacer layer 86 is deposited on each side of center region 80 in contact with the free-layer edges 82 & 84. Self-aligned FM pinned layer and pinning layer structures 88 are formed in steps 122 and 124, respectively, each of which may include several layers of different materials. Finally, in step 126, self-aligned first and second lead conductor (L1 & L2) layers 90 & 92 are formed before the photoresist is lifted off in step 128. If desired, a new photoresist pattern is formed in step 130 to prepare for deposition of self-aligned insulating layer 96 in step 132. This photoresist is lifted off in step 134 and second shunt conductor layer 94 formed in the final step 136. Such additional processing step as may be required to fabricate a completed read sensor can be readily appreciated by practitioners familiar with the art.

Figure 7:
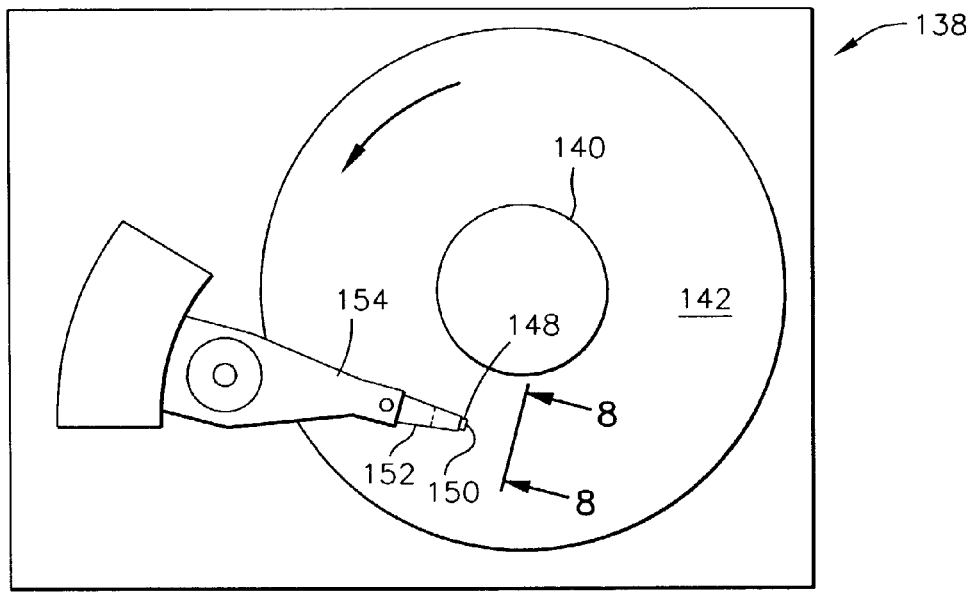
FIG. 7 is a plan view of an exemplary magnetic disk drive.
Figure 8:
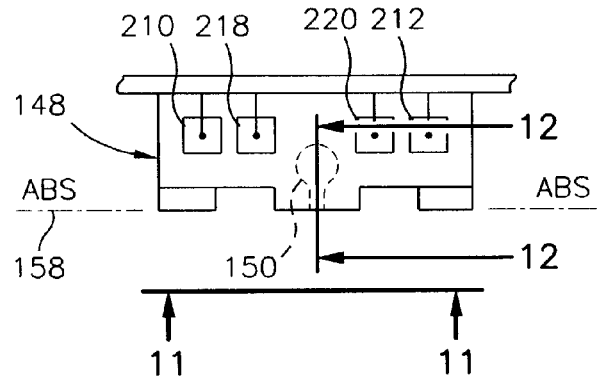
FIG. 8 is an end view of a slider with a magnetic head of the disk drive as seen in plane 8—8.
Figure 9:
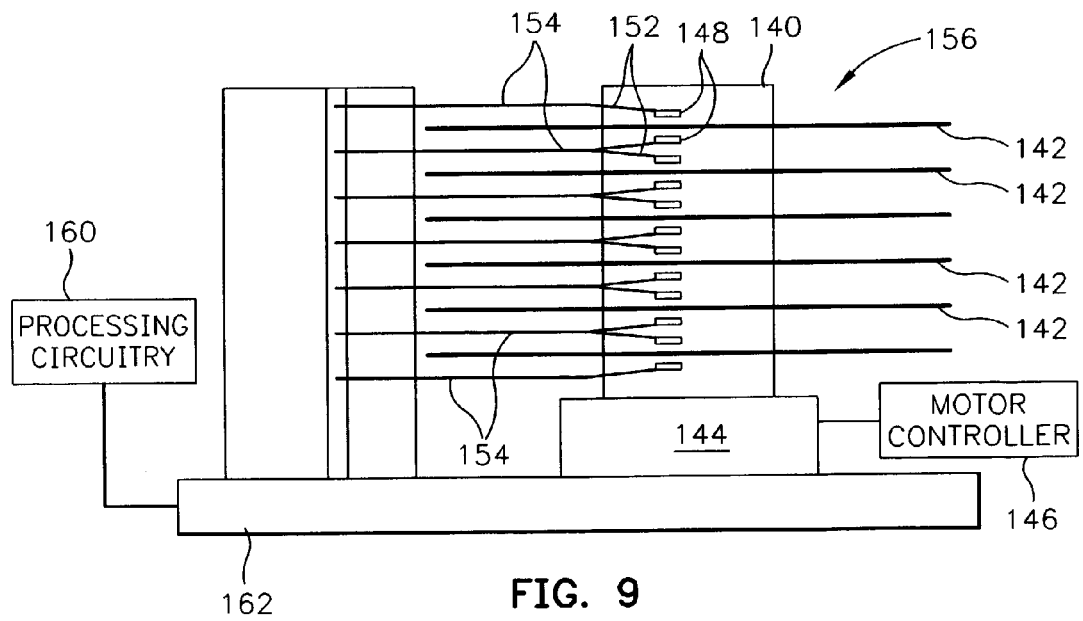
FIG. 9 is an elevation view of the magnetic disk drive wherein multiple disks and magnetic heads are employed.
Figure 10:
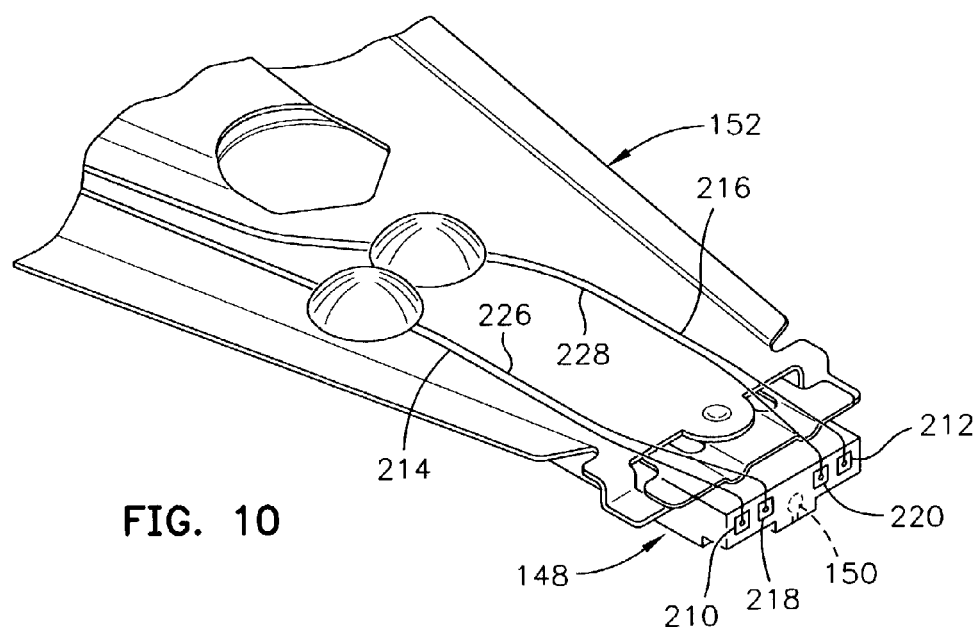
FIG. 10 is an isometric illustration of an exemplary suspension system for supporting the slider and magnetic head.

FIGS. 7–9 illustrate a magnetic disk drive 138. The drive 138 includes a spindle 140 that supports and rotates a magnetic disk 142. Spindle 140 is rotated by a motor 144 that is controlled by a motor controller 146. A slider 148 with a combined read and write magnetic head 150 is supported by a suspension 152 and actuator arm 154. A plurality of disks, sliders and suspensions may be employed in a large capacity direct access storage device (DASD) 156 as shown in FIG. 9. Suspension 152 and actuator arm 154 position slider 148 so that magnetic head 150 is in a transducing relationship with a surface of magnetic disk 142. When disk 142 is rotated by motor 144, slider 148 is supported on a thin (typically, 50 nm) cushion of air (air bearing) between the surface of disk 142 and the air bearing surface (ABS) 158. Magnetic head 150 may then be employed for writing information to multiple circular tracks on the surface of disk 142, as well as for reading information therefrom. The processing circuitry 160 exchanges signals, representing such information, with the head 150, provides motor drive signals for rotating the magnetic disk 142, and provides control signals for moving slider 148 to various tracks. In FIG. 10, slider 148 is shown mounted to suspension 152. The components described hereinabove may be mounted on a frame 162 of a housing, as shown in FIG. 9.

Figure 11:
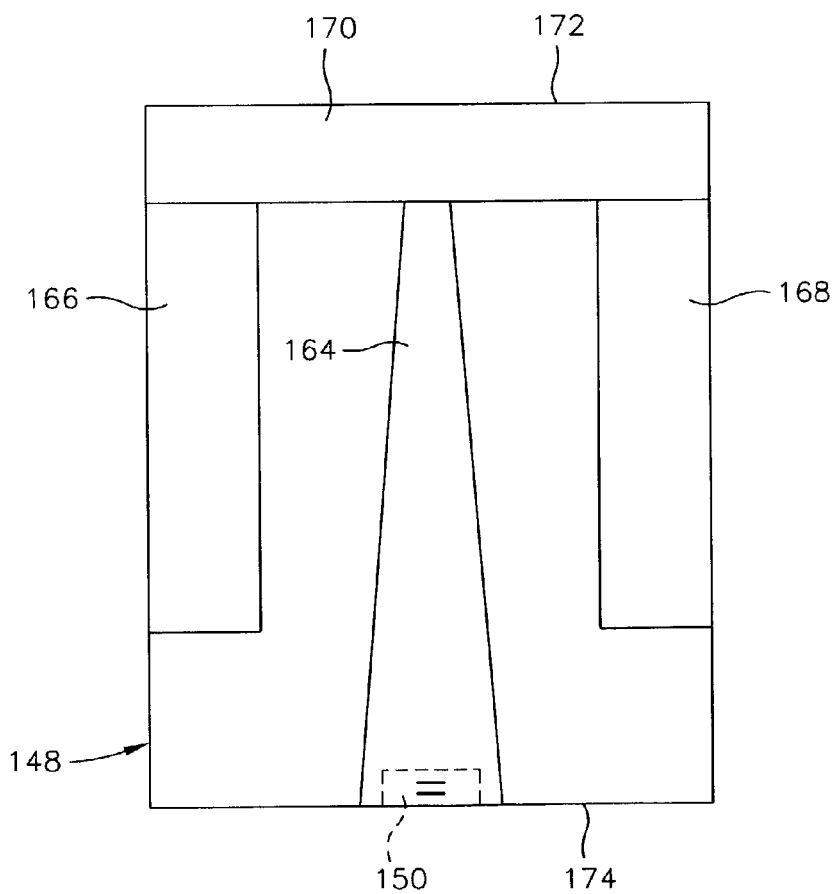
FIG. 11 is an ABS view of the magnetic head taken along plane 11—11 of FIG. 8.

FIG. 11 is an ABS view of slider 148 and magnetic head 150. The slider has a center rail 164 that supports the magnetic head 150, and side rails 166 and 168. Rails 164, 166 and 168 extend from a cross rail 170. With respect to rotation of magnetic disk 142, cross rail 170 is at a leading edge 172 of slider 148 and magnetic head 150 is at a trailing edge 174 of slider 148.

Figure 4:
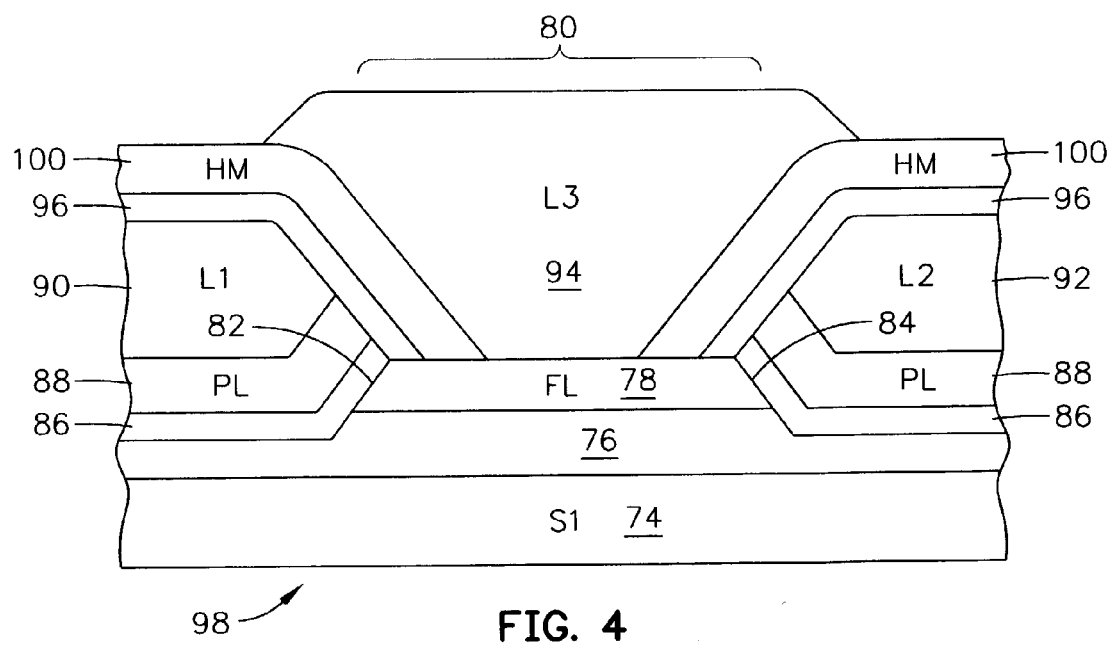
FIG. 4 is a schematic diagram illustrating part of the ABS view of an alternative stabilized embodiment of the CPP SV sensor of this invention.

FIG. 12 is a side cross-sectional elevation view of the merged MR head 150, which includes a write head portion 176 and a read head portion 178 employing the SV sensor 180 of this invention (FIGS. 3–5). FIG. 13 is an ABS view of FIG. 12. SV sensor 180 is sandwiched between first and second gap layers 182 and 184, and gap layers 182 and 184 are sandwiched between the first (S1) and second (S2) shield layers 186 and 188. The resistance of SV sensor 180 changes in response to changes in external magnetic fields. A sense current $I_S$ conducted through sensor 180 causes these resistance changes to be manifested as voltage potential changes. These potential changes are then processed as readback signals by processing circuitry 160 (FIG. 9).

The write head portion of the merged MR head includes a coil layer 190 sandwiched between the first and second insulation layers 192 and 194. A third insulation layer 196 may be employed for planarizing the head to eliminate ripples in the second insulation layer caused by the coil layer 190. First, second and third insulation layers 192–196 are referred to in the art as an "insulation stack." Coil layer 190 and first, second and third insulation layers 192, 194 and 196 are sandwiched between the first (P1) and second (P2) pole piece layers 198 and 200. First and second pole piece layers 198 and 200 are magnetically coupled at a back gap 202 and have first and second pole tips 204 and 206 that are separated by a write gap layer 208 at the ABS. As shown in FIGS. 8 and 10, the first and second solder connections 210 and 212 connect leads from SV sensor 180 to leads 214 and 216 on the suspension 152, and the third and fourth solder connections 218 and 220 connect leads 222 and 224 from coil 190 (see FIG. 14) to leads 226 and 228 on suspension 152. Although FIG. 13 shows second shield (S2) layer 188 to be merged with first pole piece (P1) layer 198, these elements may be embodied as two distinct MR layers separated by a nonmagnetic isolation layer (not shown) similar to insulation layers 192–196.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A magnetic read head for reading changes in an external magnetic field at an air bearing surface (ABS), comprising:
a sense current-perpendicular-to-plane (CPP) spin valve (SV) sensor having a center region and first and second side regions and including:
a ferromagnetic (FM) free layer located in the center region and disposed at the ABS to couple responsively to the external magnetic field;
in each of the first and second side regions, a conductive lead layer for conducting the sense current through the FM free layer between the first and second side regions;
in each of the first and second side regions, a FM pinned layer structure having a magnetic moment disposed at the ABS between a respective conductive lead layer and a respective side edge of the free layer;
in each of the first and second side regions, a nonmagnetic conductive spacer layer disposed at the ABS between a respective pinned layer structure and a respective side edge of the free layer; and
in each of the first and second side regions, an antiferromagnetic (AF) pinning layer exchange-coupled to a respective pinned layer structure for pinning the magnetic moment thereof.

2. The magnetic read head of claim 1 further comprising: another conductive lead layer in contact with the free layer in the center region for conducting the sense current and electrically isolated from the conductive lead layer in the first and second side regions.

3. The magnetic read head of claim 2 further comprising:
FM first and second shield layers; and
nonmagnetic nonconductive first and second read gap layers disposed between the first and second shield layers; wherein
the CPP SV sensor is disposed between the first and second read gap layers.

4. A magnetic head assembly having an air bearing surface (ABS), comprising:
a write head including:
ferromagnetic (FM) first and second pole piece layers that have a yoke portion located between a pole tip portion and a back gap portion, the first and second pole piece layers being connected at their back gap portions;
a nonmagnetic write gap layer located between the pole tip portions of the first and second pole piece layers; and
an insulation stack with at least one coil layer embedded therein located between the yoke portions of the first and second pole piece layers; and a read head including:
a FM first shield layer;
nonmagnetic nonconductive first and second read gap layers disposed between the first shield layer and the first pole piece layer; and
a sense current-perpendicular-to-plane (CPP) spin valve (SV) sensor having a center region and first and second side regions and including:
a ferromagnetic (FM) free layer located in the center region and disposed at the ABS to couple responsively to the external magnetic field;
in each of the first and second side regions, a conductive lead layer for conducting the sense current through the FM free layer between the first and second side regions;
in each of the first and second side regions, a FM pinned layer structure having a magnetic moment disposed at the ABS between a respective conductive lead layer and a respective side edge of the free layer;
in each of the first and second side regions, a nonmagnetic conductive spacer layer disposed at the ABS between a respective pinned layer structure and a respective side edge of the free layer; and
in each of the first and second side regions, an antiferromagnetic (AF) pinning layer exchange-coupled to a respective pinned layer structure for pinning the magnetic moment thereof.

5. The magnetic head assembly of claim 4 further comprising:
a FM second shield layer; and
the FM second shield layer and the first pole piece layer being a common layer.

6. The magnetic head assembly of claim 4 wherein the CPP SV sensor further comprises:
another conductive lead layer in contact with the free layer in the center region for conducting the sense current and electrically isolated from the conductive lead layer in the first and second side regions.

7. A magnetic disk drive including at least one magnetic head assembly with a write head and a read head for sensing changes in an external magnetic field at an air bearing surface (ABS), the magnetic disk drive comprising:

a housing;
a magnetic disk rotatably supported in the housing;
a support mounted in the housing for supporting the magnetic head assembly with the ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to the magnetic disk; and
a processor connected to the magnetic head, to the spindle motor and to the actuator for exchanging signals with the magnetic head, for controlling movement of the magnetic disk and for controlling the position of the magnetic head; wherein
the write head includes:
ferromagnetic (FM) first and second pole piece layers that have a yoke portion located between a pole tip portion and a back gap portion, the first and second pole piece layers being connected at their back gap portions;
a nonmagnetic write gap layer located between the pole tip portions of the first and second pole piece layers; and
an insulation stack with at least one coil layer embedded therein located between the yoke portions of the first and second pole piece layers; and the read head includes:
a FM first shield layer;
nonmagnetic nonconductive first and second read gap layers disposed between the first shield layer and the first pole piece layer;
a sense current-perpendicular-to-plane (CPP) spin valve (SV) sensor having a center region and first and second side regions and including:
a ferromagnetic (FM) free layer located in the center region and disposed at the ABS to couple responsively to the external magnetic field;
in each of the first and second side regions, a conductive lead layer for conducting the sense current through the FM free layer between the first and second side regions;
in each of the first and second side regions, a FM pinned layer structure having a magnetic moment disposed at the ABS between a respective conductive lead layer and a respective side edge of the free layer;
in each of the first and second side regions, a nonmagnetic conductive spacer layer disposed at the ABS between a respective pinned layer structure and a respective side edge of the free layer; and
in each of the first and second side regions, an antiferromagnetic (AF) pinning layer exchange-coupled to a respective pinned layer structure for pinning the magnetic moment thereof.

8. The magnetic disk drive of claim 7 further comprising:
a FM second shield layer; and
the FM second shield layer and the first pole piece layer being a common layer.

9. The magnetic disk drive of claim 7 wherein the CPP SV sensor further comprises:
another conductive lead layer in contact with the free layer in the center region for conducting the sense current and electrically isolated from the conductive lead layer in the first and second side regions.

10. A method of making a sense current-perpendicular-to-plane (CPP) spin valve (SV) sensor having a center region and first and second side regions for sensing changes in an external magnetic field at an air bearing surface (ABS), comprising the steps of:
- (a.1) forming a ferromagnetic (FM) free layer disposed at the ABS;
- (a.2) removing the free layer in each of the first and second side regions to define two side edges of the free layer;
- (a.3) forming a nonmagnetic conductive spacer layer over the respective side edge of the free layer in each of the first and second side regions;
- (a.4) forming a FM pinned layer structure having a magnetic moment over the respective nonmagnetic conductive spacer layer in each of the first and second side regions;
- (a.5) forming an antiferromagnetic (AF) pinning layer exchange-coupled to the respective pinned layer structure for pinning the magnetic moment thereof in each of the first and second side regions; and
- (a.6) forming a first conductive lead layer over and in conductive contact with the respective pinned layer structure in each of the first and second side regions.

11. The method of claim 10 further comprising the step of:
- (a.7) forming another conductive lead layer over and in conductive contact with the free layer in the center region.

12. The method of claim 11 further comprising the step of:
- (a.8) forming a nonmagnetic nonconductive spacing layer between the respective conductive lead layer and the other conductive lead layer in each of the first and second side regions.

13. The method of claim 12 further comprising the steps of:

- (b) forming nonmagnetic nonconductive first and second read gap layers such that the CPP SV sensor is disposed therebetween; and
- (c) forming FM first and second shield layers such that the first and second read gap layers are disposed therebetween.

* * * * *